Feb. 12, 1929.
S. E. B. SODERBERG
1,701,865
PRESSURE REGULATOR
Filed Aug. 17, 1927
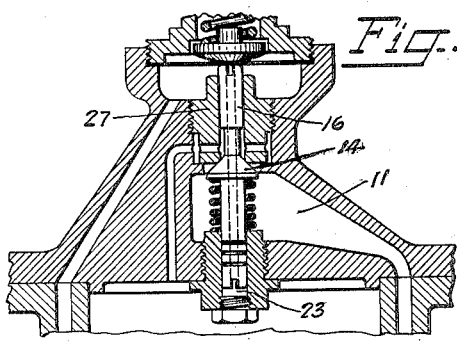
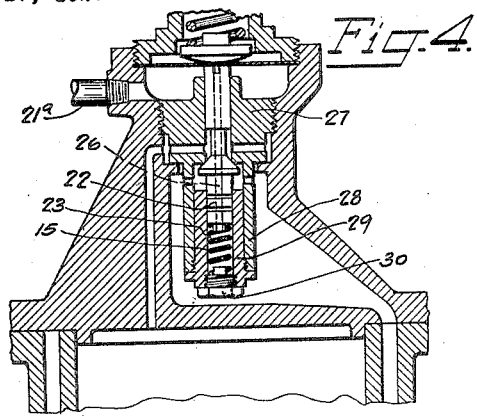
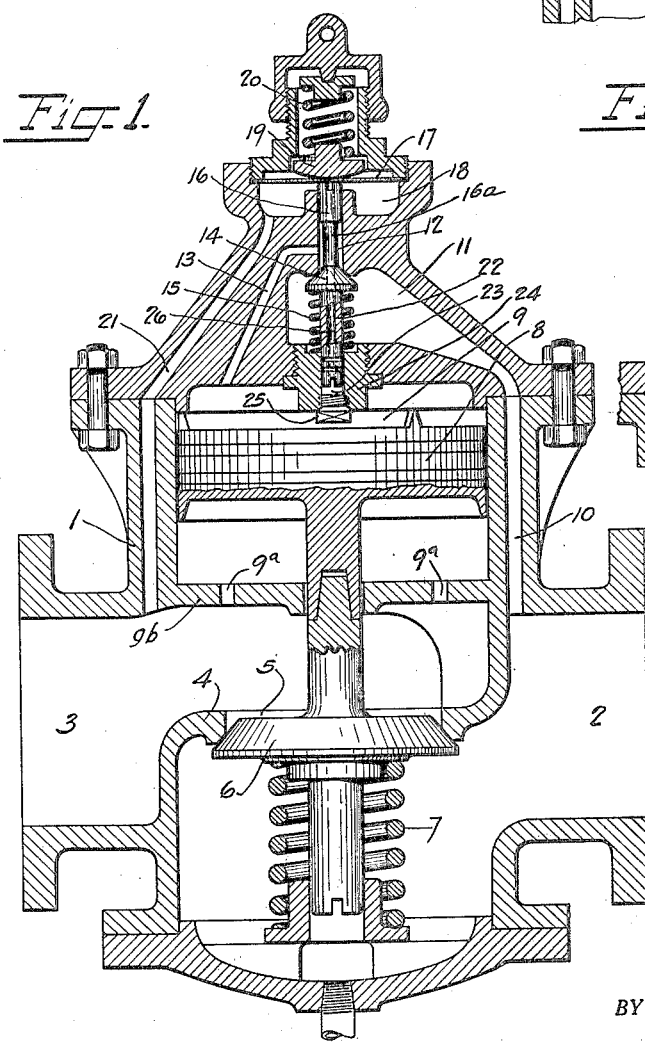
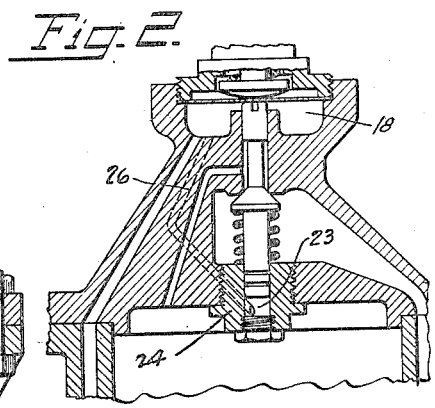
Sten E. B. Soderberg
INVENTOR.
BY O. V. Thiele
ATTORNEY.

Patented Feb. 12, 1929.

1,701,865

UNITED STATES PATENT OFFICE.

STEN E. B. SODERBERG, OF LYNDHURST, NEW JERSEY, ASSIGNOR TO LESLIE COMPANY, OF LYNDHURST, NEW JERSEY, A CORPORATION OF NEW JERSEY.

PRESSURE REGULATOR.

Application filed August 17, 1927. Serial No. 213,543.

The invention relates to pressure regulators of the type in which the main or regulating valve, which controls the admission of a fluid from a high-pressure conduit to another conduit at a lower pressure, is actuated by a piston moved against a spring by the high-pressure fluid to open the valve, the admission of such moving high-pressure fluid being governed by controlling means whose position is affected by the pressure existing on the low-pressure side of the regulating valve. A valve of this type is shown and described in United States Patent 1,173,834 granted on February 29th, 1916 to J. P. Metzger.

The present invention will be described as applied to a valve slightly modified from that of the patent referred to, this description to be read in connection with the drawing herewith, in which Fig. 1 shows a central longitudinal section of such a valve with my improvement; Fig. 2 is a fragmentary view of a similar section showing a modification; and Figs. 3 and 4 are two further similar fragmentary views showing other modifications.

Referring to Fig. 1, the main valve housing 1 has as inlet 2 for the high-pressure fluid, and an outlet 3 for the fluid of reduced pressure. The two are separated by the partition 4, which has a port 5 controlled by the upwardly seating main or regulating valve 6. This valve is urged upward toward its seat by the spring 7. It is connected with piston 8, reciprocating in cylinder 9, which is arranged in the housing 1 above valve 6. The space in cylinder 9 below piston 8 is in communication with the outlet 3 through apertures 9ª in the partition 9ᵇ.
The inlet 2 is in communication with the space of cylinder 9 above piston 8 by means of duct 10, expansion chamber 11, cylindrical chamber 12, and duct 13. The communication from 11 to 12 is controlled by the valve 14, which is urged upwardly toward its seat by spring 15, and is provided with an upwardly extending cylindrical stem 16 reciprocating in chamber 12 and pressing against the diaphragm 17, which closes the top of chamber 18. The stem 16 reciprocates in chamber 12 and has a reduced portion adjacent to the valve 14 and extending beyond the point at which duct 13 opens into the chamber 12. The opposite side of diaphragm 17 is pressed upon by the button 19, forced downward by the adjustable spring 20. Chamber 18 is connected with the outlet 3 by the duct 21. In regulating valves of this type as hitherto used the control valve 14 is a solid valve and its whole lower side is subject to whatever pressure exists at any time in chamber 11. It is at this point of the apparatus that my improvement is found. Before describing it and its effect, however, the action of the form as hitherto made will be briefly described and its shortcomings pointed out.

During normal operation the valve 6 occupies a position some little distance off its seat. If now from any cause the pressure at outlet 3 falls below the desired predetermined point, the pressure in 18 falls to the same point, and spring 20 will open valve 14 a little further. This will result in high-pressure fluid being admitted in increased quantity to chamber 12, duct 13, and cylinder 9 from the inlet 2 through duct 10 and chamber 11. As a result piston 8 will depress main valve 6 further against spring 7, thereby admitting more fluid to the outlet 3 of the main valve and so restoring the pressure at this point.

On the other hand an undue rise of the pressure at the outlet side will result in a closing movement of valve 14, a pressure drop in chamber 9, and in an upward movement of valve 6, thus lowering the pressure to that desired.

It will be understood that the pressure at which these actions will occur can be changed by the tensions given to the several springs.

In the form of valve as so far used, the controlling valve 14 is, as mentioned above, a solid valve, and when it is closed it is unbalanced as far as the fluid pressures are concerned, since the pressure on its under side is kept up to the inlet pressure with which this space is in direct communication, while the pressure on the upper end of stem 16 is substantially equal to the pressure on the outlet side of the main valve with which it is in communication by the duct 21. Delicate balancing of this valve is essential if the regulator is to give most satisfactory results, and particularly if the apparatus is intended for the reduction of pressures down to a point approaching atmospheric.

If the valve is not finely balanced it will remain closed too long when it should start its opening movement, will remain open longer than it should, and act generally in an irregular manner.

Theoretically the spring 20 can be given just the right amount of compression to counterbalance the unbalanced pressure on the under side of valve 14. Spring 20 is, however, in practice a fairly stiff spring, as it must have sufficient force to open the valve 14 against pressures which may be 200 or 300 pounds or more per square inch. This spring is therefore very poorly adapted to serve for this fine balancing adjustment. As a result this valve frequently causes the irregular action just spoken of, and this is particularly true when the pressure to which the fluid is reduced approximates the lower possible ranges.

It is the purpose of the present invention to provide an improvement obviating these difficulties and making it possible to get smooth and reliable action at all times, and to make the apparatus available for the reduction of pressure down to the low point spoken of.

For this purpose the lower side of the valve 14 carries the cylindrical stem 22, the lower end of which extends into the cylinder 23, this stem and cylinder being of the same diameter as stem 16. Cylinder 23 is preferably formed in a separate plug 24, screwed into the top wall of chamber 9, the bottom of the cylinder 23 being closed by the screw plug 25.

Through the stem 22, valve 14, and stem 16 extends the duct 26, connecting space 23 with diaphragm chamber 18.

The result of this arrangement is that the valve 14 is substantially balanced at all times as far as fluid pressures are concerned, the pressure on the top of stem 16 being equal to that on bottom of stem 22, the upward pressure on the annulus around stem 22 being equal to the downward pressure on the conical part of the valve 14 below the seat, and the downward pressure on the conical part of the valve 14 above the seat being equal to the upward pressure on the annular lower end of the enlarged upper portion of stem 16. The area of the valve seat is negligible as this seat is practically linear.

The result is that the action of the device is much prompter, the response of the valve to a departure at the outlet from the desired pressure being quicker and this outlet pressure being kept much more nearly constant. Furthermore, the instrument is capable of lowering the pressure from a high point to a much lower point than is possible with the form heretofore used.

In Fig. 2 is shown a form of my improvement in which the duct 26, connecting spaces 23 and 18, is not arranged centrally in the valve 14 and its stems, but extends through the walls of plug 24 and the housing. The effect is obviously the same as that in the first arrangement.

Fig. 3 illustrates the application of my inventive idea to a form in which the removal of valve 14 is possible from the top, which is in practice more convenient. The cylindrical bore in which the stem 16 reciprocates and against the lower end of which the valve 14 seats, is formed in a separate plug 27, which is screwed into the top wall of chamber 11. In other respects this form is closely similar to that of Fig. 1.

In the form of Fig. 4 a plug 27 is used as in Fig. 3, but this plug carries at its lower end the cage 28 into which is screwed from below the guide 29. This guide is provided with the cylindrical chamber 23 in which reciprocates the stem 22. The spring 15 in this case butts against the plug 30, screwed into the bottom of guide 29. This arrangement makes it possible to remove the entire unit from the top. The duct 26 is here formed axially in valve 14 and its stems as in the form of Fig. 1. One other variation is illustrated here, viz, the duct 21 is replaced by the pipe 21ª, the further end of which is connected to the outlet at some point distant from the valve. This variation may also be used in the forms of the other figures.

What I claim is:—

1. A pressure regulator of the class described comprising a casing having an inlet, an outlet, and a ported partition separating them; a regulating valve controlling the port; a spring tending to close the valve; the casing having a cylindrical cavity above the valve communicating at its lower end with the outlet; a piston reciprocating in said cavity and connected to the regulating valve; a detachable cover on said casing containing an expansion chamber connected with the inlet; a duct leading from the top of the expansion chamber to a point in the cavity above the piston; a control valve of the poppet type and opening toward the expansion chamber and controlling the inlet to said duct; a diaphragm chamber above the expansion chamber; a duct connecting it with the outlet; a stem extending upwardly from the control valve, and bearing against the diaphragm; a cylindrical stem extending downwardly from the control valve, said stems being of the same cross-sectional area; a screw plug in the bottom of said expansion chamber of a larger diameter than the poppet valve and provided with a cylindrical chamber in which said second stem reciprocates; and a duct connecting the diaphragm chamber with the last-named cylindrical chamber.

2. A pressure regulator according to claim 1 in which said last-named duct extends through the control valve and its two stems.

STEN E. B. SODERBERG.